(12) United States Patent
Bartsch et al.

(10) Patent No.: US 10,091,751 B2
(45) Date of Patent: Oct. 2, 2018

(54) MOBILE UNIT AND METHOD FOR TIMESTAMPING A MESSAGE EXCHANGED WITH THE MOBILE UNIT

(71) Applicant: Bayerische Motoren Werke Aktiengesellschaft, Munich (DE)

(72) Inventors: Armin Bartsch, Munich (DE); Horst Kloeden, Munich (DE); Felix Klanner, Munich (DE); Andreas Rauch, Kammerberg (DE)

(73) Assignee: Bayerische Motoren Werke Aktiengesellschaft, Munich (DE)

( * ) Notice: Subject to any disclaimer, the term of this patent is extended or adjusted under 35 U.S.C. 154(b) by 556 days.

(21) Appl. No.: 14/566,054

(22) Filed: Dec. 10, 2014

(65) Prior Publication Data

US 2015/0163759 A1    Jun. 11, 2015

(30) Foreign Application Priority Data

Dec. 11, 2013 (DE) .................. 10 2013 225 520

(51) Int. Cl.
| | |
|---|---|
| *H04W 56/00* | (2009.01) |
| *H04W 24/08* | (2009.01) |
| *H04W 40/38* | (2009.01) |
| *G01S 13/86* | (2006.01) |
| *G08G 1/0967* | (2006.01) |
| *G01S 13/93* | (2006.01) |

(52) U.S. Cl.
CPC .......... *H04W 56/004* (2013.01); *G01S 13/86* (2013.01); *H04W 24/08* (2013.01); *H04W 40/38* (2013.01); *H04W 56/001* (2013.01); *G01S 13/931* (2013.01); *G08G 1/096783* (2013.01); *G08G 1/096791* (2013.01)

(58) Field of Classification Search
None
See application file for complete search history.

(56) References Cited

U.S. PATENT DOCUMENTS

| | | | |
|---|---|---|---|
| 6,452,541 B1 | 9/2002 | Zhao et al. | |
| 2004/0213295 A1* | 10/2004 | Fehr ...................... | H04W 4/04 370/503 |
| 2008/0161014 A1* | 7/2008 | Monnerat ............. | H04W 64/00 455/456.1 |

(Continued)

FOREIGN PATENT DOCUMENTS

DE    10 2009 045 748 A1    4/2011

OTHER PUBLICATIONS

German Search Report dated May 19, 2014, including English translation (eleven (11) pages).

*Primary Examiner* — Christopher M Crutchfield
*Assistant Examiner* — Thinh D Tran
(74) *Attorney, Agent, or Firm* — Crowell & Moring LLP

(57) ABSTRACT

A mobile unit as well as a method for time-stamping a first message of the first mobile unit to a second mobile unit are provided. The method includes the steps of: determining a roundtrip time between the first mobile unit and a base station, receiving the first message sent by the first mobile unit in the base station, adding a timestamp to the first message in the base station while taking into account the roundtrip time, and sending the time-stamped first message to the second mobile unit.

10 Claims, 2 Drawing Sheets

(56) References Cited

U.S. PATENT DOCUMENTS

| | | | |
|---|---|---|---|
| 2013/0235747 A1* | 9/2013 | Le ........................ | H04W 24/08 |
| | | | 370/252 |
| 2014/0022050 A1* | 1/2014 | Dua ..................... | H04W 4/021 |
| | | | 340/5.2 |
| 2015/0280974 A1* | 10/2015 | Smith ................. | H04L 41/0677 |
| | | | 370/242 |

* cited by examiner

MOBILE UNIT AND METHOD FOR TIMESTAMPING A MESSAGE EXCHANGED WITH THE MOBILE UNIT

CROSS REFERENCE TO RELATED APPLICATION

This application claims priority under 35 U.S.C. § 119 from German Patent Application No. 10 2013 225 520.9, filed Dec. 11, 2013, the entire disclosure of which is herein expressly incorporated by reference.

BACKGROUND AND SUMMARY OF THE INVENTION

Currently, a plurality of sensors already exist which acquire information in and around the vehicle and make this information available for further processing. These include, among others, sensors for the acquisition of dynamic objects in the vehicle environment. As a rule, the information obtained in this manner contains a vehicle-specific timestamp. A timestamp is required in order to mutually merge the results of the different sensors. Assistance functions also require a uniform time base in all components for the purpose of homogenizing and, as a whole, utilizing the information of several separate system components (different vehicles, infrastructure devices, etc.)

Only in this manner can a temporal relationship be established between data of different system components. One corresponding example is the perception relating to all vehicles by which environment models of vehicles and infrastructure units are communicated to other traffic participants and are associated and merged there with the results of the local environment acquisition. When information from a vehicle or from infrastructure units is transmitted to other communication partners (Car2X), existing methods, as a rule, use NTP-based time bases (such as NTP for the synchronization between server clusters) or the global timestamp of a GPS receiver. A GPS timestamp, as provided by a GPS receiver, under optimal conditions, will indicate the measuring point in time of the satellite signals with a precision of a few nanoseconds. However, because of the receiver-internal processing time, similarly to the above-mentioned sensors, this timestamp will only be available after an, as a rule, fluctuating processing time. This processing time may range from up to 100 ms to more than 100 ms. When this timestamp is used for synchronizing other units, this processing time will result in an equally high uncertainty. For example, at a vehicle speed of 30 m/s, this results in an error of more than 3 m. Furthermore, the GPS timestamp is only available with an updating rate of 1 to 20 Hz.

The performance of a time synchronization by means of an NTP server is, among other things, coupled to the efficiency of the basic operating system of the client to be synchronized (for example, Windows) and to the utilization of the server network. As a function of the time behavior of these two components, different uncertainties and time delays may arise. In order to synchronize two computers (NTP server and NTP client), which are mutually connected by a network (for example, the Internet), the NTP will measure the roundtrip delay of packets between the NTP server and the client. The NTP is based on the assumption that the transmission latency between the server and the client has the same length and is therefore in each case half the roundtrip delay.

However, in connection with the above-mentioned solutions, it is problematic that the availability for the time synchronization is not sufficient for security applications. Thus, for example, a GPS-based time base cannot be synchronized in the case of a system start in a blocked area (for example, in an underground garage or a street canyon between tall buildings). On the other hand, NTP servers, which synchronize themselves, for example, by way of the power supply system, are susceptible to power outages.

It is therefore an object of the present invention to eliminate the above-mentioned problems at the signal exchange between two mobile units. For this purpose, a method is provided for time-stamping a first message of a first mobile unit to a second mobile unit. In addition, a corresponding mobile unit is provided. According to the method of the invention, a roundtrip time is determined between the first mobile unit and a base station. The roundtrip time relates to that communication path that is provided for the first message. The determination of the roundtrip time can take place in the base station, which base station is further developed, for example, as part of a terrestrial mobile communication system. Such base stations are, for example, called "NodeB" or "eNodeB". After the roundtrip time has been determined, the first message sent by the first mobile unit will be received in the base station. This message may, for example, contain information that is based on sensor signals of the first mobile unit. Such sensor signals may, for example, represent collision-relevant information which is forwarded to additional mobile units by way of the base station. Since, as initially mentioned, a common time base of the mobile units is required or information for the integration of the content of the message in a common time context, according to the invention, while taking into account the roundtrip time, a timestamp is added to the first message. The timestamp may be added by using a time base determined within the base station.

In particular, the taking into account of the roundtrip time takes place such that the timestamp permits a conclusion as to the point in time at which the first message or the information contained therein had been created. When the time-stamped first message is subsequently sent to the second mobile unit, the second mobile unit can check and correspondingly interpret the contained data with respect to their age by using an own time base. The second mobile unit can, for example, extrapolate sensor data as well as a vehicle speed, which are contained within the first message, in order to estimate a change of the data while taking into account the travel time of the first message. For example, collision-relevant traffic situations can be interpreted by way of speed and range information in the first message by means of the timestamp and can therefore be processed for creating a more precise image of the vehicle environment.

The present invention therefore has the advantage, among others, that information exchanged between all involved vehicles concerning environment information and traffic situations has a higher added value because it permits credible conclusions for the recipient.

Preferably, the roundtrip time can already be determined in the base station, before the receiving of the message sent by the first mobile unit, by way of a second message sent from the base station and/or from the first mobile unit. This can, for example, take place cyclically in order to always have a suitable roundtrip time available between a base station and a respective mobile unit for a possibly required time-stamping. The second message for determining the roundtrip time may, for example, be a simple ping, as used between the NTP server and the NTP client in computer networks for determining a transmission latency. It is, for example, also contemplated that a respective mobile unit cyclically determines a roundtrip time and adds the roundtrip time when sending the first message to the base station. In this manner, by means of its own time base in connection with the roundtrip time, the base station can add a suitable timestamp, in which case, in the base station, particularly the information for the roundtrip time can be exchanged against the timestamp, whereby transmission bandwidth is saved. When the roundtrip time is determined only in an event-based manner, thus only just before a sensor signal is to be sent as a first message, communication expenditures by cyclical roundtrip determination can additionally be avoided.

The first mobile unit and the second mobile unit may be developed as passenger cars, as unmanned transport units, as watercraft or aircraft. In particular, vehicles authorized to be driven on roads (irrespective of their drive concept) are addressed, because the unpredictably changeable conditions with respect to the communication infrastructure available to them make a time-stamping by a base station seem advantageous without these limitations. Even when a vehicle as the mobile unit is shielded in an underground garage from satellite-based locating signals and therefore has no access to a global time base, the sending of a sensor signal on the basis of the present invention can provide sensor signals, for example, by way of terrestrial mobile communication infrastructures, which can be analyzed by additional mobile units.

Information, which is sent by the first mobile unit in the form of the first message to the base station or to a second mobile unit, may be determined, for example, by use of ultrasound, lidar, radar or laser sensors. In addition or as an alternative, the first message may also contain speed or location information of the first mobile unit which, after a delayed reception by a second mobile unit, can be appropriately interpreted on the basis of the timestamp.

In order to carry out the time-stamping within the base station in a particularly reliable and exact manner, the base station may be equipped for receiving time signals concerning different communication paths from the same or from different time sources. For example, a first signal can be determined by a receiver of a satellite-based locating system. This receiver may have a higher-value design than receivers used in mass-produced articles (such as vehicles, navigation systems, smartphones, etc.). In this manner, a highly accurate interpretation of the time base of one or more satellites becomes possible.

For consolidating the time signal, a second time base is received, for example, by way of a terrestrial mobile communication system (GSM, EDGE, UMTS, LTE LTE-A, etc.) or by way of a local access point (such as an access point of a WiFi network). Theoretically, other globally available systems with a known time behavior may also be used. Naturally, signals received from additional transmitters or sources can also be taken into account for creating the time base. On the basis of the available time base signals, a time base is determined for the base station, and the first message is provided with a timestamp by using the time base. For determining the time base from several signals, for example, a maximal-value function can be applied to time signals received within a predefined time period. When, for example, within an interval of 10 ms, the signal of two different sources is received, during the subsequent creation of the time stamp, that time signal can be used that has the higher amount. The present time signal having the highest amount is probably subjected to the lowest transmission latency, so that it represents the most reliable starting point for providing the time base. In this manner, the respective time base having the lowest tolerance can be established particularly in the case of fluctuating transmission conditions of different possible time signals. Also the time stamp and the information contained in the first message therefore have the highest possible quality.

According to a second aspect of the present invention, a mobile unit is provided which is further developed particularly as a road vehicle (for example, a passenger car). The mobile unit comprises a sensor which is implemented, for example, as an environment sensor. Concerning the operating principles of the environment sensor system, reference is made to the examples described in connection with first-mentioned aspect of the invention. In addition, the mobile unit comprises a send-receive (transceiver) unit which can, for example, exchange wireless signals with a base station and/or with other mobile units. According to the invention, the mobile unit is equipped for picking up a collision-relevant environment signal by use of sensors, which environment signal is potentially of interest also to a second mobile unit. Furthermore, by way of the send-receive unit, the mobile unit is able to carry out a roundtrip time determination while interacting with a base station and supporting this roundtrip time determination. The send-receive unit also has the purpose of sending the signal picked up by use of the sensor and possibly a determined roundtrip time by way of the base station to a second mobile unit. The characteristics, the combination of characteristics and the advantages resulting therefrom correspond to those indicated in connection with the first-mentioned aspect of the invention such that reference is made to the previous statements in order to avoid repetitions.

Other objects, advantages and novel features of the present invention will become apparent from the following detailed description of one or more preferred embodiments when considered in conjunction with the accompanying drawings.

DETAILED DESCRIPTION OF THE DRAWINGS

Figure 1:
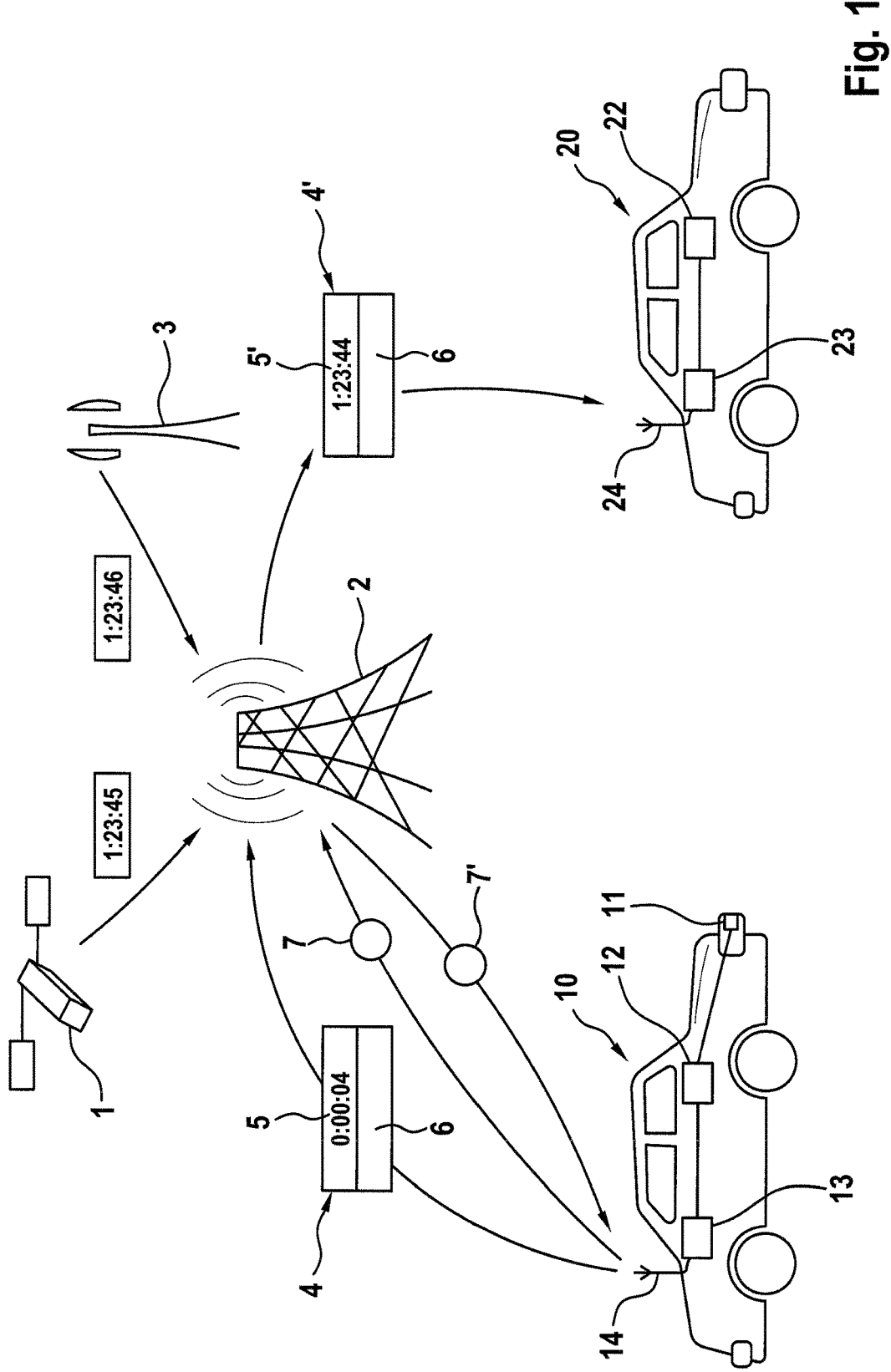
FIG. 1 is a schematic operational overview of exemplary components used in carrying out an embodiment of a method according to the invention.

FIG. 1 illustrates a setting, in which two vehicles 10, 20 communicate as mobile units by way of a base station 2. Furthermore, the base station 2 is connected with a satellite 1 and a transmitting tower 3 of a radio transmitter. By way of the satellite 1, the base station 2 receives a first time signal, which, in the example, reads 1:23:45. By way of the transmitting tower 3 of the radio transmitter, the base station 2 receives another time signal which, in the example, reads 1:23:46. In other words, the time signal received by way of the transmitting tower 3 has a higher value, which implies a shorter transmission duration. As a result, the time signal of the transmitting tower 3 is more up-to-date and is used as the time base within the base station 2. The first vehicle 10, as the first mobile unit, includes an ultrasound sensor 11 as an environment sensor, which is in data communication with an analyzing unit 12. The analyzing unit 12 determines collision-relevant environment objects and, if required, forwards corresponding information to a send-receive (transceiver)

unit 13. The send-receive unit 13 is equipped for determining a roundtrip time between the first vehicle 10 and the base station 2. For this purpose, the send-receive unit 13 sends a ping 7 by way of an antenna 14 to that base station 2 which answers by means of a response 7'. From the time delay between the sending of the ping 7 and the reception of the response 7', the send-receive unit 13 determines the roundtrip time, which in the example amounts to 0:00:04, and is sent in a field location 5 of a message 4 as a first message to the base station 2. The message 4 further includes a data field 6, in which is contained the information determined by way of the ultrasound sensor 11.

Since the roundtrip time between the first vehicle 10 and the base station 2 is not required for the second vehicle 20, but a global time base is required for the analysis of the sensor signals, the base station 2 replaces the roundtrip time in the field location 5 of the message 4, before sending the message 4' to the second vehicle 20, by using the determined time base. In this case, the base station 2 subtracts half the roundtrip time, in order to assign its probable origination point in time to the data contained in the data field 6. Correspondingly, the timestamp 1:23:44 (specifically 1:23:46−(0:00:04)/2=1:23:44) is contained in the message 4'. The data field 6 is contained in an essentially unchanged form. The second vehicle 20 receives the second message 4' by way of the antenna 24 and its send-receive (transceiver) unit 23 and analyzes the second message 4' inside an analyzing unit 22. Naturally, the second vehicle 20 itself could also have sensors (not shown) in order to be able to be used as a first vehicle in a method according to the invention.

Figure 2:
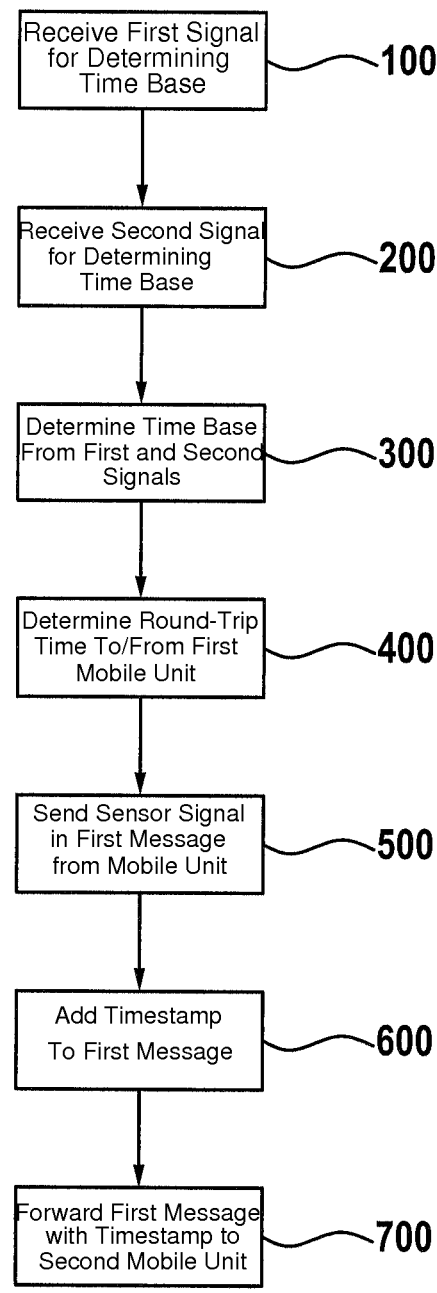
FIG. 2 is a schematic flow chart illustrating steps of an embodiment of a method according to the invention.

FIG. 2 is a flow chart showing steps of an embodiment of a method according to the invention. In Step 100, a first signal for determining a time base is received from a first transmitter by the base station. Correspondingly, a second signal for procuring a time base is received from a second transmitter by the base station in Step 200. In Step 300, a time base for the base station is determined from the received time base signals (for example, by using a maximal-value function). In order to correctly carry out the time-stamping, a roundtrip time is to be additionally determined. For this purpose, a message is sent back and forth between a first mobile unit and the base station in Step 400, and the elapsed time is determined for the entire roundtrip (possibly including an intermediate storage time). Subsequently, in Step 500, a sensor signal, which had been generated within the first mobile unit, will be sent in the form of a first message to the base station. This first message can contain a value determined for the roundtrip time. In response to the reception of the first message in the base station, a timestamp is added to the first message in Step 600, which timestamp may, for example, replace the value for the roundtrip time. If the roundtrip time had been determined in the base station, the base station can insert the timestamp cleared of the roundtrip time in a hitherto blank data field and, in Step 700, forward the first message with the added timestamp to the second mobile unit. The second mobile unit can now evaluate the added timestamp in view of an own time base and determine the entire transmission time of the first message. In other words, the origination point in time of the sensor data contained in the first message can be reconstructed and be taken into account during their evaluation. A possibility can thereby be created according to the invention of sending sensor data from one mobile unit to a second mobile unit, without the transmission time leading to unnecessarily high tolerances during the evaluation.

LIST OF REFERENCE NUMBERS

1 Satellite
2 Base station
3 Transmission tower of a radio transmitter
4 First message (without a timestamp)
4' First message (with a timestamp)
5 Data field for roundtrip time
5' Data field for timestamp
6 Data field for sensor data
7 Ping
7' Response
10 First vehicle
11 Ultrasound sensor
12 Analyzing unit
13 Send-receive unit
14 Antenna
20 Second vehicle
22 Analyzing unit
23 Send-receive unit
24 Antenna
100, 700 Method steps The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

What is claimed is:

1. A method for time-stamping messages sent to mobile units, the method comprising the acts of:
   determining, by a first mobile unit, a roundtrip time of a message between the first mobile unit and a base station;
   sending to the base station by the first mobile unit a first message including at least the roundtrip time;
   receiving at the base station the first message and a first time stamp generated from at least one of a transmitting tower and a satellite;
   generating a second time stamp for a second message to be sent to a second mobile unit by subtracting from the first time stamp having the latest time value one half of the roundtrip time; and
   sending the second message to the second mobile unit, the second message including at least the second time stamp.

2. The method according to claim 1, wherein:
   the first mobile unit is a transportation unit, and/or
   the first message comprises information determined via a sensor.

3. The method according to claim 2, wherein:
   the second mobile unit is a transportation unit, and/or
   the sensor is an environment sensor.

4. The method according to claim 1, wherein the act of determining the roundtrip time is carried out at predefined points-in-time.

5. The method according to claim 1, wherein the act of determining the roundtrip time is carried out in response to predefined events.

6. The method according to claim 1, wherein
   the base station receives a first signal from a first transmitter for creating a time base, and
   the base station receives a second signal from a second transmitter for creating the time base.

7. The method according to claim 6, wherein:
   the first signal originates from a satellite-based location system, and/or
   the second signal originates from a mobile communication system.

8. The method according to claim 7, wherein the mobile communication system operates according to at least one of GSM, EDGE, UMTS, LTE, LTE-A, or WiFi standards.

9. The method according to claim 7, further comprising the acts of:
applying a maximal-value function to time signals received in a predefined time period from the first transmitter and from the second transmitter in order to determine a communication path having a shortest transmission duration; and
using the time signal received via the communication path having the shortest transmission duration as the time base in the base station.

10. A mobile system, comprising:
a first mobile unit;
a second mobile unit;
a base station; and
at least one of a transmitting tower and a satellite, wherein
the first mobile unit is configured to determine a roundtrip time of a message between the first mobile unit and the base station,
the first mobile unit is configured to send to the base station a first message including at least the roundtrip time,
the base station is configured to receive the first message and a first time stamp generated from the at least one of the transmitting tower and the satellite,
a second time stamp is generated for a second message to be sent to the second mobile unit by subtracting from the first time stamp having the latest time value one half of the roundtrip time, and
the second message is sent to the second mobile unit, the second message including at least the second time stamp.

* * * * *